United States Patent [19]

Heppolette et al.

[11] 4,215,027

[45] Jul. 29, 1980

[54] AQUEOUS THERMOSETTABLE COATING COMPOSITIONS COMPRISING AQUEOUS COPOLYMER LATEX, AMINE NEUTRALIZED COPOLYMER AND MELAMINE-FORMALDEHYDE RESIN

[75] Inventors: Robert L. Heppolette, Islington, Canada; Hamid I. Khan, Rawalpindi, Pakistan; Ian H. McEwan, Kleinburg, Canada

[73] Assignee: Canadian Industries Limited, Montreal, Canada

[21] Appl. No.: 831,292

[22] Filed: Sep. 7, 1977

Related U.S. Application Data

[63] Continuation of Ser. No. 593,242, Jul. 7, 1975, abandoned.

[30] Foreign Application Priority Data

Jul. 16, 1974 [GB] United Kingdom ............... 31427/74

[51] Int. Cl.² ............................................. C08L 61/28

[52] U.S. Cl. ............................ 260/29.4 UA; 428/460; 525/185; 525/160; 525/163

[58] Field of Search ................ 260/29.4 UA, 851, 856

[56] References Cited

U.S. PATENT DOCUMENTS

| | | | |
|---|---|---|---|
| 3,107,227 | 10/1963 | Suen .................................. | 260/856 X |
| 3,218,280 | 11/1965 | Koral ................................ | 260/856 X |
| 3,245,932 | 4/1966 | Glavis ................................ | 260/29.4 |
| 3,821,145 | 6/1974 | Wallis ................................ | 260/29.4 |
| 3,862,071 | 1/1973 | DiCarlo ............................. | 260/29.4 |
| 3,919,154 | 11/1975 | Chang et al. ................. | 260/29.4 UA |
| 3,926,888 | 12/1975 | Cheung ............................. | 260/29.4 |
| 3,928,273 | 12/1975 | Chang ............................... | 260/29.4 |

Primary Examiner—Theodore E. Pertilla
Attorney, Agent, or Firm—Cushman, Darby & Cushman

[57] ABSTRACT

Aqueous thermosetting coating compositions comprising a blend of (1) an aqueous latex of an acrylic copolymer, (2) an amine-neutralized acrylic copolymer, and (3) a melamine-formaldehyde resin.

20 Claims, No Drawings

AQUEOUS THERMOSETTABLE COATING COMPOSITIONS COMPRISING AQUEOUS COPOLYMER LATEX, AMINE NEUTRALIZED COPOLYMER AND MELAMINE-FORMALDEHYDE RESIN

This is a continuation of application Ser. No. 593,242 filed July 7, 1975, now abandoned.

This invention relates to water-based coating compositions that can be pigmented with metallic flake and other classes of pigments to give quality finishes suitable for automobile and truck finishes.

Currently there are in use water-based acrylic thermosetting enamel systems as automobile and truck finishes. These systems generally fall into the category of water soluble or dissolved polymer systems. Such systems are characterized by having low application solids and exhibit a tendency to "pop" or blister when baked at acceptable film builds. Current practice for the application of such systems to substrates involves a four coat system with a partial bake (at temperatures below the boiling point of water) after two coats have been applied followed by another two coats and then a final bake.

Attempts to make latex-based, acrylic, thermosetting enamels have certain inherent advantages and disadvantages over water-soluble systems. On the positive side, there are:

1. The ability to work at higher molecular weights without the problem of low application solids.
2. The lack of "solvation" forces associated with dissolved polymers reduces the tendency to "pop" on baking thicker films.
3. A lower demand for organic solvents reduces the level of these components helping to meet environmental regulations.
4. The potential of higher molecular weights can result in improved paint performance. On the negative side, there are:
1. The well known difficulty in obtaining high gloss.
2. The unusual viscosity-solids relationship of latex systems which results in a tendency to sag and to have poor mottling characteristics for metallic finishes.
3. The potential for poor latex particle coalescence.

In E. I. du Pont de Nemours' U.S. Pat. No. 3,862,071 issued on Jan. 21, 1975, there is disclosed a coating composition which combines both dispersed and dissolved copolymers with a water soluble or water dispersible melamine resin.

In the disclosed aqueous system, the dispersed acrylic copolymer component comprises from 18% to 42%, by weight, based on the weight of film-forming constituents, while the dissolved acrylic copolymer comprises from 30% to 60% by weight, based on the weight of film-forming constituents. This copolymer is formed by polymerization in organic solvents and converted to a dispersed and soluble polymeric system by amine neutralization and the addition of water. Further, the acrylic copolymer system so formed has a uniformity factor of at least 75% and preferably 80-95%. The addition of the monomers during preparation of the dispersed acrylic polymer is timed to produce a polymer having this uniformity factor.

We have now found that this uniformity factor is of no consequence, since components of an acrylic latex made by classical aqueous emulsion polymerization techniques, a dissolved or soluble acrylic copolymer, and a water soluble or dispersible melamine resin, a highly desirable automobile and truck finish can be formulated that possesses the following highly desirable characteristics:

1. Higher application solids, thus giving the potential for fewer coats to get adequate film builds and thus having reduced overall organic emissions per job.
2. Good application, gloss and appearance properties and freedom from mottle.
3. Considerably reduced tendency to "pop" or blister on baking, thus eliminating the need for a "split" bake system. Unlike that of the earlier mentioned du Pont patent, the present invention provides a heterogeneous system and the proportions of latex copolymer and solution copolymer are quite different. Thus the present invention provides an aqueous thermosetting coating composition comprising a blend having a pH in the range of from about 6-9 of (1) from about 40 parts to about 90 parts by weight of an aqueous latex of a copolymer made by aqueous emulsion polymerization techniques and having a reduced viscosity in the range of from about 0.2 to about 0.8 dl/g., measured at 25° C. in ethylene dichloride/ethanol (95/5) at 0.5 g. copolymer per 100 ml. solvent, the copolymer comprising from about 93% to about 75% by weight, based on the total weight of copolymer of one or more main monomers selected from the group consisting of styrene, $\alpha$-methyl styrene, alkyl acrylates, alkyl methacrylates, alkyl itaconates, alkyl maleates and alkyl fumarates wherein the alkyl group contains from 1 to 12 carbon atoms; from about 5% to about 25% by weight, based on the total weight of copolymer, of reactive monomers, the reactive monomers comprising from about 5% to about 15% by weight, based on the total weight of copolymer, of a hydroxyalkyl acrylate or hydroxyalkyl methacrylate wherein the alkyl group contains from 2 to 4 carbon atoms; and from about 2% to about 10% by weight, based on the total weight of copolymer, of an $\alpha,\beta$-ethylenically unsaturated carboxylic acid;

(2) from about 5 parts to about 40 parts by weight of a dissolved, compatible, amine-neutralized copolymer having a reduced viscosity in the range of from about 0.12 to about 0.50 dl./g., measured at 25° C. in ethylene dichloride/ethanol (95/5) at 0.5 g. copolymer per 100 ml. solvent, the copolymer comprising from about 5% to about 25% by weight, based on the total weight of copolymer, of a hydroxyalkyl acrylate or hydroxyalkyl methacrylate, wherein the alkyl group contains from 2 to 4 carbon atoms; from about 2% to about 15% by weight, based on the total weight of copolymer, of an $\alpha,\beta$-ethylenically unsaturated carboxylic acid; and from about 93% to about 60% by weight based on the total weight of copolymer, of one or more monomers selected from the group consisting of styrene alkyl acrylates, alkyl methacrylates, alkyl itaconates, alkyl maleates and alkyl fumarates, wherein the alkyl group contains from 1 to 12 carbon atoms; and (3) from about 8 parts to about 40 parts by weight of a water soluble or water dispersible melamine-formaldehyde resin; with the sum of components (1), (2) and (3) totaling 100 parts by weight. Preferably the aqueous copolymer latex of component (1) comprises from about 45 parts to about 80 parts by weight per 100 parts by weight of the coating composition. The preferred reduced viscosity RV range for the copolymer is from about 0.35 to about 0.7 dl/g. Preferably the copolymer comprises from about 93% to about 85% by weight, based on the total weight of copolymer, of the main monomers; from about 5% to about 15% by weight, based on the total weight of copolymer, of the hydroxy alkyl acrylate or hydroxylalkyl methacrylate; and from about 2% to about 5% by weight, based on the total weight of copolymer, of the α,β-ethylenically unsaturated carboxylic acid.

Representative of the preferred alkyl radicals for the alkyl acrylates, alkyl methacrylates, alkyl itaconates, alkyl maleates and alkyl fumarates wherein the alkyl group is methyl, ethyl, propyl, isopropyl, butyl, isobutyl, hexyl, 2-ethyl hexyl, octyl etc. The preferred hydroxy alkyl acrylates are hydroxyethyl acrylate and hydroxypropyl acrylate while the preferred hydroxy alkyl methacrylates are hydroxypropyl methacrylate and hydroxyethyl methacrylate. Finally the preferred α,β-ethylenically unsaturated carboxylic acids are acrylic acid and methacrylic acid and most preferred is methacrylic acid.

As previously indicated, the latex copolymer of component (1) may be generally characterized as comprising main monomers and reactive monomers (the latter being the α,β-ethylenically unsaturated carboxylic acid and the hydroxyalkyl acrylate or methacrylate monomers). The main monomers are preferably selected from combinations of hard and soft monomers; hard monomers being defined as forming homopolymers with Tg 40° C. and soft monomers being defined as forming homopolymers with Tg>40° C. Tg is the glass transition temperature. The preferred soft monomers for the copolymer may be selected from the group consisting of butyl acrylate, butyl methacrylate, 2-ethyl hexyl acrylate and 2-ethyl hexyl methacrylate. The preferred hard monomers are styrene and methyl methacrylate. Since the choice of soft monomer determines the quantity and choice of hard monomer, it is necessary to characterize the composition of the copolymer on the basis of the former. Thus, when the soft monomer is butyl acrylate, the preferred copolymer composition is styrene/methyl methacrylate/butyl acrylate/reactive monomers in the respective percent by weight ranges of 73-0/0-73/20-50/7-20. When the soft monomer is butyl methacrylate, the preferred copolymer composition is styrene/methyl methacrylate/butyl methacrylate/reactive monomers in the respective percent by weight ranges of 0-43/0-43/50-93/7-20. When the soft monomer is 2-ethyl hexyl acrylate, the preferred copolymer composition is styrene/methyl methacrylate/2-ethyl hexyl acrylate/reactive monomers in the respective percent by weight ranges of 0-78/0-78/15-40/7-20. Finally, when the soft monomer is 2-ethyl hexyl methacrylate, the preferred copolymer composition is styrene/methyl methacrylate/2-ethyl hexyl methacrylate/reactive monomers in the respective percent by weight ranges of 0-53/0-53/40-70/7-20.

Component (2) of the coating composition of the present invention is preferably present in the range of from about 15 parts to about 35 parts by weight per 100 parts by weight of the coating composition, when the composition is used to formulate metallic flake pigment systems, and is present in the range of from about 7 parts to about 30 parts by weight per 100 parts by weight of the coating composition when the composition is used to formulate non-metallic pigment systems.

The reduced viscosity, RV of the dissolved copolymer preferably ranges from about 0.15 to about 0.45 dl./g.

Turning now to the composition of the copolymer of component (2), the dissolved, compatible copolymer preferably comprises from about 10% to about 15% by weight, based on the total weight of copolymer, of an hydroxyalkyl acrylate or an hydroxyalkyl methacrylate; from about 2% to about 5% by weight, based on the total weight of copolymer, of an α,β-ethylenically unsaturated carboxylic acid; and from about 88% to about 80% by weight, based on the total weight of copolymer, of one or more monomers selected from styrene, alkyl acrylates, alkyl methacrylates, alkyl itaconates, alkyl maleates and alkyl fumarates, wherein the alkyl group contains from 1 to 12 carbon atoms.

Representative of the preferred alkyl radicals for the alkyl acrylates, alkyl methacrylates, alkyl itaconates, alkyl maleates and alkyl fumarates are methyl, ethyl, propyl, isopropyl, butyl, isobutyl, hexyl, 2-ethyl hexyl, octyl, etc. The preferred hydroxyalkyl acrylates are hydroxyethyl acrylate and hydroxypropyl acrylate while the preferred hydroxyalkyl methacrylates are hydroxypropyl methacrylate and hydroxyethyl methacrylate. Finally, the preferred β-ethylenically unsaturated carboxylic acids are acrylic acid and methacrylic acid, most preferably methacrylic acid.

The preferred compositions for the dissolved copolymer comprise styrene/methyl methacrylate/butyl acrylate/hydroxypropyl methacrylate/acrylic acid in the respective percent by weight ranges of 0-30/0-63/70-25/10-20/2-5.

The term "compatible" when used in relation to this copolymer indicates that the dissolved copolymer must be compatible with the latex copolymer of component (1) and the melamine-formaldehyde resin both in the liquid composition and when baked out as a finish. In the liquid phase, compatibility means that the stability of the system is such that no phase separation occurs while in the baked finish, the pigmented baked film should not suffer loss of gloss.

The term "dissolved" or soluble indicates that the amine-neutralized copolymer is dissolved or soluble (giving clear or slightly hazy-solutions) in one or more mixtures of water and water-miscible organic solvents, usually the solvents in which it is prepared and which meet pollution regulations for composition and level.

The melamine-formaldehyde resin may preferably comprise from about 8 parts to about 15 parts by weight per 100 parts by weight of the coating composition of the invention when lower levels of the dissolved copolymer are present. When higher levels of the dissolved copolymer are present, from about 15 parts to about 30 parts by weight per 100 parts by weight of the coating composition of the melamine-formaldehyde resin are preferably used.

The melamine-formaldehyde resins suitable for use in the composition of the invention may be selected from conventional alkylated melamine-formaldehyde resins designed for water-based coatings having a ratio of —CH$_2$OR groups to —CH$_2$OH groups, where R is lower alkyl, of at least 5:1. The resins can be prepared by known techniques in which a lower alcohol such as methanol, ethanol, butanol, isobutanol, propanol, isopropanol or 2-butoxyethanol is reacted with melamine-formaldehyde to provide pendant hydroxy groups. Examples of commercially available resins of this type are "Cymel" 300, "Cymel" 301, "Cymel" 303 ("Cymel" is a trade mark), "Uformite" MM-83 (trade mark) and "Resimene" 740 (trade mark). In fact, any conventional alkylated, e.g. butylated, melamine-formaldehyde resin may be used provided it meets the requirement of aqueous solubility, compatibility or dispersibility in the final system.

The aqueous copolymer dispersion constituting component (1) of the blend of the invention is prepared according to methods known in the art for making such dispersions. If desired surface-active agents may be used to affect the water solubilities of the various components. Examples of surface active agents include the following, either alone or in combination: "Benax" 2Al (trade mark) which is sodium dodecyl diphenyl ether disulphonate, "Igepal" CO 730 (trade mark) which is nonyl phenoxypoly(ethylenoxy 15) ethanol, "Igepon" T 77 (trade mark) which is sodium N-methyl-n-oleoyl-laurate, "Aerosol" TR (trade mark) which is the bis (tridecyl) ester of sodium sulphosuccinic acid, "Triton" X-200 (trade mark) which is sodium alkyl aryl polyether sulphonate (28% solids solution).

"Sipon" WD (trade mark) which is sodium lauryl sulphate, and

"Siponate" DS-10 (trade mark) which is sodium dodecyl benzene sulphonate.

"Aerosol" A196 (trade mark) which is sodium dialkyl sulphosuccinate.

It is, however, possible to prepare dispersions without such agents, i.e. to prepare the copolymers using a surfactant-free polymerisation method (ef. J. Applied Polymer Science, Vol. 18, No. 2, p. 427 (1974). Alternatively, the copolymer may be prepared using a stabilizing material comprising principally a water soluble, polymerizable, ionic monomer selected from the group consisting of vinyl sulphonate and allyl sulphonate and sulpho esters of the formula:

$$R-CO_2-Q-SO_3M$$

Wherein R is selected from the group consisting of vinyl and α-substituted vinyl, Q is a divalent hydrocarbon radical having its valence bonds on different carbon atoms and M is a cation selected from the group consisting of sodium, potassium, lithium, morpholinium, lower alkyl ($C_1$-$C_4$) morpholinium, ammonium, substituted ammonium compounds of the formula $NR'_4$ wherein R' is hydrogen, alkyl ($C_1$-$C_4$) or alkanolamino ($C_1$-$C_3$), this ionic monomer forms part of the copolymer particles.

A very small percentage of a conventional surface active agent may be included with the polymerizable ionic monomer. For example, not more than 0.2% by weight, based on the weight of total monomers, of surface active agent is required, when from 1% to 5% by weight of the ionic monomer, based on the weight of total monomers is included in the polymerization mixture. The surface active agent may be selected from the agents described earlier.

The sulpho esters represented by the above structural formula are described at length in U.S. Pat. Nos. 2,914,499, 2,923,734, 3,024,221 and 3,033,833 granted to the Dow Chemical Company on Nov. 24, 1959, Feb. 2, 1960, Mar. 6, 1962 and May 8, 1962, respectively. Examples of the ionic monomers include 2-sulphoethyl acrylate, 2-sulphoethyl α-ethylacrylate, 2-sulphoethyl α-butylacrylate, 2-sulphoethyl α-hexylacrylate, 2-sulphoethyl α-cyclohexylacrylate, 2-sulphoethyl α-chloroacrylate, 2-sulpho-1-propyl acrylate, 2-sulpho-1-propyl methacrylate, 1-sulpho-2-propyl acrylate and methacrylate, 2-sulpho-1-butyl acrylate and methacrylate, 1-sulpho-2-butyl acrylate and methacrylate, 3-sulpho-2-butyl acrylate and methacrylate, 2-methyl-2-sulpho-1-propyl acrylate, 2-methyl-1-sulpho-2-propyl acrylate, 3-bromo-2-sulpho-1-propyl acrylate, 3-bromo-1-sulpho-2-propyl acrylate, 3-chloro-2-sulpho-1-propyl acrylate, 1-bromo-3-sulpho-2-butyl acrylate, 1-bromo-2-sulpho-3-butyl acrylate, 1-chloro-3-sulpho-2-butyl acrylate, 1-chloro-2-sulpho-3-butyl acrylate, 3-bromo-2-sulpho-1-butyl acrylate, 3-bromo-1-sulpho-2-butyl acrylate, 3-chloro-2-sulpho-1-butylacrylate, 3-chloro-1-sulpho-2-butyl acrylate, 1-chloro-2-methyl-3-sulpho-2-propyl acrylate, 1-chloro-2-methyl-2-sulpho-3-propyl acrylate, 1-chloro-2-(chloromethyl)-3-sulpho-2-propyl acrylate, 1-chloro-2-(cyloromethyl)-2-sulpho-2-propyl acrylate, 3-methoxy-2-sulpho-3-propyl acrylate, 3-methoxy-1-sulpho-2-propyl acrylate, 2-sulpho cyclohexyl acrylate, 2-phenyl-2-sulphoethyl acrylate, 1-phenyl-2-sulphoethyl acrylate, 3-sulpho-1-propyl acrylate, 3-sulpho-1-butyl acrylate, 4-sulpho-1-butyl acrylate, arsulphophenyl acrylate, ar-sulphophenyl methacrylate, 2-(ar-sulphophenoxy)-ethyl acrylate and their sulphonate salts.

Preferred ionic monomers are 2-sulphoethyl methacrylate, vinyl sulphonate and allyl sulphonate.

The latex copolymer may contain from about 0% to about 15% by weight of a plasticizer for the copolymer. The plasticizer may be added to the monomer mixture during polymerization (pre-plasticiaation) as described in our copending Canadian Patent Application No. 176,446 filed on July 13, 1973. The plasticizer may alternatively be added to the latex copolymer after polymerization according to conventionally known methods for post-plasticization. The plasticizers may be any of those conventionally used for this purpose. Suitable plasticizers are described in the aforementioned patent application.

The reduced viscosity and hence the molecular weight of the latex copolymer in component (1) may be controlled by the use of conventional agents used for this purpose, e.g. chain transfer agents, such as primary octyl mercaptan or monomethyl ether of dipropylene glycol.

Conventional polymerisation initiators may also be employed in the preparation of the aqueous copolymer emulsion. For example, persulphates, hydrogen peroxide, perborates, peroxides, hydroperoxides and azo compounds soluble in water with convenient radical forming reaction rates, including redox systems can be used.

To get adequate latex and final paint stability, it is necessary to neutralize the latex to a pH of from 6 to 9. This neutralization is carried out using ammonia or amines, preferably organic amines such as alkylamines, arylamines and alkanolamines. Examples of these amines are triethylamine, di-n-propylamine, diethanolamine, ethanolamine and dimethylethanolamine.

The solution copolymer constituting component (2) may also be prepared according to conventional methods for making substantially (60–100%) amine-neutralized dissolved or soluble polymers in media consisting of ≧80% by weight of water, the remaining portion ≦20% consisting of ammonia or amines and water-soluble solvents e.g. alcohols, glycols, glycol ethers, etc.) The amines for this neutralization may be the same as those used for the amine neutralization of the latex.

The various components of the composition may be blended simply by mixing them slowly, with continuous gentle agitation. At this stage it is essential to include materials to aid the stability of the latex system.

Pigments may be incorporated into the composition of the invention, usually by formulating dispersions of the pigments in the components (2) and/or (3) prior to addition. In addition, other conventional paint additives may be included in the composition of the invention, e.g. fillers, dyes, resins, organic water soluble solvents and the like.

The composition allows the preparation of surface coatings suitable as automobile and truck finishes. These water-borne paints can be applied at high film builds in a few coats without popping after a high temperature bake due to higher application solids (30–45% by weight at application) and the relatively fast release of water and organic solvents from the system compared with aqueous soluble systems (the kind of range is from 22–33% by weight solids at application) which are known to be poor in this respect.

The following examples are used to illustrate the various embodiments of the present invention. All parts, percentages and ratios are by weight unless otherwise specified.

EXAMPLE 1

In this Example there is prepared an automotive finish based on an acrylic aqueous emulsion system. By varying the composition of the acrylic aqueous emulsion a range of properties can be achieved. The following list describes the paint properties of the system.

| | |
|---|---|
| % Total Solids | = 30–45% by weight |
| % Organic Volatiles | = 15–20% by weight (amines, butyl "Cellosolve" and butanol) |
| Application viscosity | = 16–30 secs. Ford No. 4 cup at 25° C. |
| Gloss (20° head) | = 65–90 units |
| Film Thickness | = 2.2 mils |
| Application | = 2 or 3 coats with a 3 min. flash between coats. This is followed by 15 minutes at spray booth ambient conditions. |
| Bake | = 15 mins. at 140° F. followed by 30 mins. at 300° F. |

The application and bake conditions described above indicate the elimination of the split bake and the ability to apply higher film builds due to higher application solids.

The following are typical compositions for water-borne enamels using the water-based, thermosetting acrylic enamel of the present invention:

| Colour - Medium Blue Metallic Enamel | Parts by wt. |
|---|---|
| 45% by weight total solids acrylic copolymer latex | 65.2 |
| 30% by weight triethanolamine | 0.71 |
| 50% by weight aluminum millbase | 2.08 |
| Blue millbase | 2.81 |
| "Cymel" 301 | 3.7 |
| 40% by weight total solids dissolved acrylic copolymer | 14.8 |
| Deionized water | 4.1 |
| Butyl "Cellosolve" | 5.1 |
| Butanol | 1.1 |
| Total | 100.00 |

| Colour - Off White | Parts by Weight |
|---|---|
| 45% by weight total solids acrylic copolymer latex | 59.8 |
| 30% by weight triethanolamine | 0.65 |
| White millbase | 20.0 |
| "Cymel" 301 | 2.9 |
| 40% total solids dissolved acrylic copolymer | 4.75 |
| Deionized water | 2.7 |
| Butyl "Cellosolve" | 8.1 |
| Butanol | 1.1 |
| Total | 100.00 |

These two formulations can be applied at relatively high solids 40–35% and 48–42%, respectively, if so desired, by using the acrylic latex and soluble polymers identified below. The range of solids is due to the different viscosity requirements of the various types of application equipment. Generally the enamel may be reduced to the desired spray viscosity by dilution with water and/or suitable organic solvent.

Preparation of Typical Dissolved Acrylic Copolymer

A five liter flask was set up with stirring, condensing and monomer addition facilities.

To the flask were added:

| | Parts by weight |
|---|---|
| Isopropanol | 22.92 |
| Butyl "Cellosolve" | 6.98 |

The above were heated to reflux and the following were added over a 2 hour period:

| | Parts by weight |
|---|---|
| Methyl methacrylate | 14.95 |
| Butyl acrylate | 8.97 |
| Hydroxypropyl Methacrylate | 4.48 |
| Acrylic acid | 1.50 |
| Azodiisobutyronitrile | 0.34 |
| Octane thiol | 0.12 |

The above were held to reflux for 4 hours. At this time the solution was found to have an RV=0.17 dl/g. and a total solids content of 51% by weight.

The equipment was converted for distillation and 7.97 parts by weight of butyl "Cellosolve" were added. The low boiling distillate (150° C.) was removed, with the total quantity of distillate collected being 22.92 parts. The remaining solution was cooled to 100° C. and 1.89 parts by weight of dimethylaminoethanol were added. While the temperature was maintained at 70°–90° C., 29.89 parts of warm deionized water were added very slowly. The whole was stirred for ½ hour and cooled. The resulting solution copolymer had a total solids content of 39.5% by weight and a Gardner-Holdt Viscosity equal to $Z_5$–$Z_6$.

Preparation of Typical Acrylic Copolymer Latex

Methyl methacrylate/styrene/butyl acrylate/hydroxy-propylmethacrylate/methacrylic acid copolymers (42/10/40/5/3 ratio). A surfactant solution was prepared by stirring 12 parts "Aerosol" A-196 and 24 parts of "Siponate" DS 10 until dissolved in 2406 parts of water.

An aqueous charge of 230 parts of water and 210 parts of the above-surfactant solution was prepared and heated to 80° C. An addition of 15 parts of water, 1.5 parts of sodium persulphate and 1.5 parts of sodium bicarbonate was made and the whole was held at 80° C. for 30 minutes.

An emulsion (1) of the following ingredients was prepared and added to the above over 3½ to 3¾ hours.

|  | Parts |
|---|---|
| Methyl methacrylate | 477 |
| Styrene | 114 |
| Butylacrylate | 454 |
| Methacrylic acid | 38 |
| 1-Octanethiol | 4.8 |
| Surfactant solution | 580 |
| Water | 474 |
| Sodium persulphate | 1.5 |
| Sodium bicarbonate | 3.0 |

A further emulsion (2) of the following ingredients was prepared and immediately added to the above over 1¼ to 1½ hours.

|  | Parts |
|---|---|
| Methyl methacrylate | 119 |
| Styrene | 28 |
| Butyl acrylate | 114 |
| Hydroxypropyl methacrylate (99% distilled grade) | 74 |
| 1-Octanethiol | 1.5 |
| Surfactant solution | 210 |
| Sodium persulphate | 0.8 |

After the additions, the whole was held for 1 hour at 80° C. and then cooled to 25° C. and filtered through a 10μ bag. The resulting latex had a T.S.=45%, RV=0.33 dl/g.

The evaporation characteristics of water-borne coatings are dominated by the fact that water has a single boiling point, high latent heat of evaporation and is very dependent on the ambient relative humidity. In addition, it is different from most other solvents in that it readily forms azeotrope compositions with many other solvents. This can either increase or decrease the boiling point and hence volatility of water. Since the rate of evaporation of water is very sensitive to the ambient temperature, the pre-bake and final bake conditions must take this factor into consideration.

The finishes of the present invention have the advantageous ability to lose water and organic solvents more rapidly than finishes based on water soluble acrylic copolymers.

In the following Table I, data is shown from a study of the Time-Weight Loss Relationship at Spray Booth Air Velocity that illustrates that the present invention loses liquid rapidly without need of heat which is one factor of importance in eliminating the problem of "popping".

TABLE I

| Time For Release of Water and Organic Solvents | System | |
|---|---|---|
|  | Finish of the present invention | water-soluble Finish |
| minutes | % solids | |
| 2 | 42 | 1.5 |
| 5 | 52 | 25-37 |
| 10 | 80 | 35-53 |
| 15 | 85 | 45-63 |
| 20 | 88 | 50-67 |

The films applied in the above study were 0.3 to 0.4 mils thick. The finish of the present invention was 85% solids at the gun. The water-soluble finishes (several were studied) were 22-30% solids at the gun.

EXAMPLE 2

In this example there is prepared a second automotive finish based on an acrylic emulsion system somewhat different from that of Example 1 and designed to give a gain in pop resistance and mottle control. Again, by varying the composition of the acrylic emulsion a range of properties can be achieved. The following list describes the properties of the paint system:

| | |
|---|---|
| % Total Solids | = 30-45% by weight (at spray viscosity) |
| % Organic Volatiles | = 12-20% by weight (amines, butyl "Cellosolve" and butanol) |
| Application Viscosity | = 16-25 secs. Ford No. 4 Cup at 25° C. |
| Gloss (20° head) | = 70-74 units for a typical metallic formulation 90 units for a typical non-metallic formulation |
| Film thickness | = 1.7 to 2.0 mils |
| Application | = 2 or 3 coats with a 1½ min. flash between coats. This is followed by 5-10 mins. at spray booth ambient conditions. |
|  | = 5 mins. at 225°-250° F. followed by 25 mins. at 300° F. |

The above application and baked conditions show a significant improvement in pop resistance and mottle control.

The bake conditions for this paint system are much more stringent than those described for the system of Example 1. This difference is due to a change in the composition and level of the dissolved acrylic copolymer. The bake conditions here are indeed surprising in view of the fact that the initial bake can take place above the boiling point of water.

The following are typical compositions for waterborne enamels using the water based thermosetting acrylic enamels of the present invention.

| Colour - Light Blue Metallic Enamel | Parts by Weight |
|---|---|
| 45% by weight total solids acrylic copolymer latex[a] | 42.79 |
| 30% by weight triethanolamine | 0.4 |
| Phthalocyanine Blue Millbase[b] | 1.17 |
| Quindo Magenta Millbase[c] | 0.09 |
| Acid Resistant Aluminum | 2.89 |
| "Cymel" 301 | 6.21 |
| Dissolved acrylic copolymer[d] | 25.58 |
| Butyl "Cellosolve" | 4.78 |
| Butanol | 1.06 |
| Water | 13.16 |
| 80/20 Water/butyl "Cellosolve" | 1.88 |

| Colour - Light Blue Metallic Enamel | Parts by Weight |
|---|---|
| Total | 100.00 |

$^a$Methyl methacrylate/styrene/butyl acrylate/hydroxy propyl methacrylate/methacrylic acid in the respective (% by weight) quantities 42/10/40/5/3 RV = 0.37 dl/g.
$^b$A Cowles mix of phthalocyanine blue pigment (14 pts. by wt.), "Cymel" 301 (20 pts by wt.) deionized water (33 pts by wt.), butyl "Cellosolve" (33 pts. by wt.) and a trace amount of triethanolamine was prepared and passed twice through a sand mill.
$^c$Same as for $^b$ except Quindo Magenta pigment used in place of phthalocyanine blue pigment.
$^d$ Methyl methacrylate/butyl acrylate/hydroxypropyl methacrylate/acrylic acid in the respective (% by weight) quantities 20.5/61.6/15.4/3 RV = 0.2 dl/g.
This enamel had a % by weight total solids = 37.2 (package solids)
% by weight solvent = 20
No. 4 Ford Cup viscosity = 65 sec. (package viscosity)

The latex/melamine-formaldehyde/dissolved copolymer was combined in the respective parts by weight of 54/18/28.

In the following Table II there is listed a range of compatible dissolved acrylic polymers. The polymers were each evaluated as having adequate compatibility with one acrylic lates copolymer consisting of methyl methacrylate/styrene/butyl acrylate/hydroxypropyl methacrylate/methacrylic acid in the respective proportions (percent by weight) 42/10/40/5/3 and having an RV=0.34 dl./g. and with "Cymel" 301 in the range of ratios (parts by weight) latex copolymer/dissolved copolymer/"Cymel" 301=73-38/15-5/12.

TABLE II

| No. | Dissolved Copolymer Composition MMA/BA/HPMA/AA* % by weight | Reduced Viscosity-RV dl/g. |
|---|---|---|
| 1. | 20/60/15/5 | 0.104 |
| 2. | 30/50/15/5 | 0.123 |
| 3. | 40/40/15/5 | 0.147 |
| 4. | 50/30/15/5 | 0.157 |
| 5. | 51.3/30.8/15.4/2.5 | 0.152 |
| 6. | 52.9/31.8/10/5.3 | 0.151 |
| 7. | 20.5/61.6/15.4/2.5 | 0.109 |
| 8. | 21.2/63.5/10/5.3 | 0.103 |
| 9. | 20.5/61.6/15.4/2.5 | 0.109 |
| 10. | 20.5/61.6/15.4/2.5 | 0.144 |
| 11. | 20.5/61.6/15.4/2.5 | 0.155 |

*MMA = methyl methacrylate, BA = butyl acrylate, HPMA = hydroxypropylmethacrylate and AA = acrylic acid Copolymer No. 11 was evaluated with the above-mentioned copolymer latex and "Cymel" 301 in the range of ratios (parts by weight) latex copolymer (dissolved copolymer/"Cymel" 301 = 63-53/25-35/12. Light blue metallic enamels were prepared which gave finishes with much improved gloss, mottle control and "pop" resistance. Preliminary testing showed the system to have improved 150° F., QCT performance, adhesion and mechanical properties when the level of "Cymel" 301 was increased from 12% to 18% indicating that increased levels of soluble copolymer required increased levels of "Cymel" 301 of the formula. Good results with little loss in application solids were also obtained with dissolved copolymers having RV's of 0.2 and 0.33 dl/g.

In Table III there are listed formulations and RV's for latex copolymers that were evaluated for use in the coating composition of the present invention for the purpose of selecting an optimum.

TABLE III

| No. | Copolymer Latex Composition % by weight ratios MMA/S/BA/HPMA/MAA* | Copolymer/ Dibenzyl Adipate Plasticizer** | Reduced Viscosity RV dl/g |
|---|---|---|---|
| 1 | 52/10/30/5/3 | 90/10 | 0.42 |
| 2 | 52/10/30/5/3 | " | 0.34 |
| 3 | 52/10/30/5/3 | " | 0.22 |
| 4 | 62/10/20/5/3 | " | 0.32 |
| 5 | 42/10/40/5/3 | " | 0.32 |
| 6 | 62/0/30/5/3 | " | 0.35 |
| 7 | 42/20/30/5/3 | " | 0.32 |
| 8 | 42/10/40/5/3 | 100/0 | 0.54 |
| 9 | 42/10/40/5/3 | " | 0.361 |
| 10 | 42/10/40/5/3 | " | 0.33 |
| 11 | 52/10/30/5/3 | " | 0.32 |
| 12 | 32/10/50/5/3 | " | 0.35 |
| 13 | 52/0/40/5/3 | " | 0.34 |
| 14 | 32/20/40/5/3 | " | 0.34 |
| 15 | 12/10/70*/5/3 *BMA in place of BA | " | 0.246 |
| 16 | 35/10/47*/5/3 *EHMA in place of BA | " | 0.216 |
| 17 | 32/30/30/5/3 | " | 0.322 |
| 18 | 42/10/40/5/3 | " | 0.347 |
| 19 | 62/10/20/5/3 | " | 0.347 |
| 20 | 72/10/10/5/3 | " | 0.358 |
| 21 | 52/10/30/5/3 | " | 0.405 |
| 22 | 72/10/10/5/3 | 90/10 | 0.318 |
| 23 | 40/10/40/5/5 | 100/0 | 0.382 |
| 24 | 35/10/40/5/10 | " | 0.365 |
| 25 | 35/10/35/10/10 | " | 0.377 |
| 26 | 35/10/40/10/5 | " | 0.365 |
| 27 | 10/42/40/5/3 | " | 0.406 |
| 28 | 0/52/40/5/3 | " | 0.348 |
| 29 | 0/62/30/5/3 | " | 0.382 |
| 30 | 10/52/30/5/3 | 100/0 | 0.35 |
| 31 | 10/40/40/5/5 | " | 0.37 |
| 32 | 10/35/40/5/10 | " | 0.375 |
| 33 | 10/35/35/10/10 | " | 0.342 |
| 34 | 10/35/40/10/5 | " | 0.357 |
| 35 | 22/10/60*/5/3 *EHMA in place of BA | " | 0.375 |
| 36 | 46/10/36*/5/3 *EHA in place of BA | " | 0.403 |
| 37 | 12/10/70*/5/3 *BMA in place of BA | " | 0.33 |
| 38 | 35/10/47*/5/3 *EHMA in place of BA | " | 0.33 |
| 39 | 57/10/25*/5/3 *EHA in place of BA | " | 0.33 |

*MAA = methyl methacrylate
S = styrene
BA = butylacrylate
HPMA = hydroxypropyl methacrylate
MAA = methyacrylic acid
BMA = butyl methacrylate
EHMA = 2-ethylhexyl methacrylate
EHA = 2-ethylhexyl acrylate
**preplasticized In the following Table IV there are shown formulations of various latex copolymers and dissolved or soluble copolymers which are suitable for formulating into coating compositions according to the present invention. Possible formulations using the copolymers are given. The melamine-formaldehyde resin in all cases is "Cymel" 301.

TABLE IV

| Latex Copolymer Composition % by weight ratios MMA/S/BA/HPMA/MAA | Reduced Viscosity RV dl/g. | Dissolved Acrylic Copolymer Composition % by weight ratios MAA/BA/HPMA/AA | Reduced Viscosity RV dl/g. | Pigment | Coating Composition Latex Copolymer/MF/Dissolved Acrylic Copolymer parts by weight ratios |
|---|---|---|---|---|---|
| 42/10/40/5/3 | 0.33 | 20.5/61.6/15.4/2.5 | 0.2 | Off-white & light blue metallic | 62.5/12.5/25 |
| | | | | | 59.5/16.7/23.8 |
| | | | | | 56.6/20.8/22.6 |
| | | | | | 52.7/12.5/34.8 |
| | | | | | 50.1/16.7/33.2 |
| | | | | | 47.7/20.8/31.5 |

TABLE IV-continued

| Latex Copolymer Composition % by weight ratios MMA/S/BA/HPMA/MAA | Reduced Viscosity RV dl/g. | Dissolved Acrylic Copolymer Composition % by weight ratios MAA/BA/HPMA/AA | Reduced Viscosity RV dl/g. | Pigment | Coating Composition Latex Copolymer/MF/Dissolved Acrylic Copolymer parts by weight ratios |
|---|---|---|---|---|---|
| 32/30/30/5/3 | 0.383 | 50/30/15/5 | 0.15 | Off-white & light blue metallic | 81/12/7 (Off-white) |
| 47/10/30/10/3 | 0.44 | 20.5/61.5/15.4/2.5 | 0.2 | | 73/12/15 (Off-white) |
| 48/10/30/10/2 | 0.356 | | | | 73/12/15 (Metallic) |
| 32/25/30/10/3 | 0.33 | | | | 57.5/12.5/30 (Metallic) |
| 37/10/40/10/3 | 0.42 | | | | |
| 27/10/50/10/3 | 0.366 | | | | |
| 7/10/70/10/3* | 0.429 | | | | |
| *BA substituted by BMA | | | | | |
| 32/30/30/5/3 | 0.383 | 20.5/61.6/15 4/2.5 | 0.2 | Light Blue metallic | 54/18/28 |
| 47/10/30/10/3 | 0.44 | | | | |
| 48/10/30/10/2 | 0.356 | | | | |
| 32/25/30/10/3 | 0.33 | | | | |
| 37/10/40/10/3 | 0.42 | | | | |
| 27/10/50/10/3 | 0.366 | | | | |
| 7/10/70/10/3* | 0.429 | | | | |
| *BA substituted by BMA | | | | | |
| 42/10/40/5/3 | 0.36 | 20.5/61.6/15 4/2.5 | 0.194 | Light blue metallic & | 52/18/30 |
| 42/10/40/5/3 | 0.45 | 20.5/61.6/15.4/2.5 | 0.321 | medium blue metallic | |
| 47/10/30/10/3 | 0.407 | | | | |
| 52/10/30/5/3 | 0.387 | | | | |
| 35/10/40/10/5 | 0.399 | | | | |

MMA = methyl methacrylate
S = styrene
BA = butyl acrylate
HPMA = hydroxypropyl methacrylate
MAA = methacrylic acid
AA = acrylic acid
BMA = butyl methacrylate
MF = melamine-formaldehyde

What we claim is:

1. An aqueous thermosetting coating composition, the polymeric binder of which comprises a blend having a pH in the range of from about 6–9 of (1) from about 40 parts to about 90 parts by weight of a latex of a copolymer made by emulsion polymerization techniques and having a reduced viscosity in the range of from about 0.2 to about 0.8 dl/g measured at 25° C. in ethylene dichloride/ethanol (95/5) at 0.5 g copolymer per 100 ml solvent, the copolymer comprising from about 93% to about 75% by weight, based on the total weight of copolymer, of one or more main monomers selected from the group consisting of styrene, α-methyl styrene, alkyl acrylates, alkyl methacrylates, alkyl itaconates, alkyl maleates and alkyl fumarates wherein the alkyl group contains from 1 to 12 carbon atoms, from about 7% to about 25% by weight, based on the total weight of copolymer of reactive monomers, the reactive monomers comprising from about 5% to about 15% by weight, based on the total weight of copolymer of a hydroxyalkyl acrylate or hydroxyalkyl methacrylate, wherein the alkyl group contains from 2 to 4 carbon atoms and from about 2% to about 10% by weight, based on the total weight of copolymer, of an α,β-ethylenically unsaturated carboxylic acid;

(2) from about 5 parts to about 40 parts by weight of a dissolved, compatible amine-neutralized copolymer having a reduced viscosity in the range of from about 0.12 to about 0.50 dl/g measured at 25° C. in ethylene dichloride/ethanol (95/5) at 0.5 g. copolymer per 100 ml solvent, the copolymer comprising from about 5% to about 25% by weight, based on the total weight of copolymer, of a hydroxyalkyl acrylate or hydroxyalkyl methacrylate, wherein the alkyl group contains from 2 to 4 carbon atoms, from about 2% to about 15% by weight based on the total weight of copolymer, of an α,β-ethylenically unsaturated carboxylic acid; and from about 93% to about 60% by weight, based on the total weight of copolymer, of one or more monomers selected from the group consisting of styrene, alkyl acrylates, alkyl methacrylates, alkyl itaconates, alkyl maleates, and alkyl fumarates, wherein the alkyl group contains from 1 to 12 carbon atoms; and (3) from about 8 parts to about 40 parts by weight of a water soluble or water dispersible melamine-formaldehyde resin; with the sum of components (1), (2) and (3) totaling 100 parts by weight.

2. A composition as claimed in claim 1 wherein the latex copolymer of component (1) comprises from about 45 parts to about 80 parts by weight per 100 parts by weight of the coating composition.

3. A composition as claimed in claim 1 wherein the reduced viscosity range for the latex copolymer of component (1) is from about 0.35 to about 0.7 dl/g.

4. A composition as claimed in claim 1 wherein the latex copolymer of component (1) comprises from about 93% to about 85% by weight, based on the total weight of copolymer of the main monomers; from about 5% to about 20% by weight, based on the total weight of copolymer of reactive monomers, the reactive monomers comprising from about 5% to 15% by weight based on the total weight of copolymer of the hydroxyalkyl acrylate or hydroxyalkyl methacrylate; and from about 2% to about 5% by weight, based on the total weight of copolymer, of the α,β-ethylenically unsaturated carboxylic acid.

5. A composition as claimed in claim 1 wherein the main monomers are selected from the group consisting of styrene, methyl methacrylate, butyl acrylate, butyl methacrylate, 2-ethylhexyl acrylate and 2-ethylhexyl methacrylate.

6. A composition as claimed in claim 1 wherein the hydroxyalkyl acrylates are hydroxyethyl acrylate and hydroxypropyl acrylate and the hydroxy-alkyl methacrylates are hydroxypropyl methacrylate and hydroxyethyl methacrylate.

7. A composition as claimed in claim 1 wherein the $\alpha,\beta$-ethylenically unsaturated carboxylic acid is acrylic acid or methacrylic acid.

8. A composition as claimed in claim 1 wherein the copolymer of component (1) comprises styrene/methyl methacrylate/butyl acrylate/reactive monomers in the respective percent by weight ranges of 73-0/73-0/20-50/7-20.

9. A composition as claimed in claim 1 wherein the copolymer of component (1) comprises styrene/methyl methacrylate/butyl methacrylate/reactive monomers in the respective percent by weight ranges of 0-43/0-43/50-93/7-20.

10. A composition as claimed in claim 1 wherein the copolymer of component (1) comprises styrene/methyl methacrylate/2-ethyl hexyl acrylate/reactive monomers in the respective percent by weight ranges of 0-78/0-78/15-40/7-20.

11. A composition as claimed in claim 1 wherein the copolymer of component (1) comprises styrene/methyl methacrylate/2-ethyl hexyl methacrylate/reactive monomers in the respective percent by weight ranges of 0-53/0-53/40-70/7-20.

12. A composition as claimed in claim 1 wherein the dissolved copolymer of component (2) comprises from about 15 parts to about 35 parts by weight per 100 parts by weight of the coating composition, when the composition is used to formulate metallic flake pigmented systems.

13. A composition as claimed in claim 1 wherein the dissolved copolymer of component (2) comprises from about 7 parts to about 30 parts by weight per 100 parts by weight of the coating composition when the composition is used to formulate non-metallic pigmented systems.

14. A composition as claimed in claim 1 wherein the reduced viscosity range for the dissolved copolymer of component (2) is from about 0.15 to about 0.45 dl/g.

15. A composition as claimed in claim 1 wherein the dissolved copolymer of component (2) comprises from about 10% to about 15% by weight, based on the total weight of copolymer of an hydroxyalkyl acrylate or an hydroxyalkyl methacrylate; from about 2% to about 5% by weight, based on the total weight of copolymer of an $\alpha,\beta$-ethylenically unsaturated carboxylic acid; and from about 88% to about 80% by weight, based on the total weight of copolymer, of one or more monomers selected from styrene, alkyl acrylates, alkyl methacrylates, alkyl itaconates, alkyl maleates and alkyl fumarates, wherein the alkyl group contains from 1 to 12 carbon atoms.

16. A composition as claimed in claim 1 wherein the dissolved copolymer of component (2) comprises styrene/methyl methacrylate/butyl acrylate/hydroxypropyl methacrylate/acrylic acid in the respective percent by weight ranges of 0-30/0-63/70-25/10-20/2-5.

17. A composition as claimed in claim 1 wherein the melamine-formaldehyde resin of component (3) comprises from about 8 parts to about 15 parts by weight per 100 parts of the coating composition when lower levels of the dissolved copolymer of component (2) are present.

18. A composition as claimed in claim 1 wherein the malamine-formaldehyde resin of component (3) comprises from about 15 parts to about 30 parts by weight per 100 parts by weight of the coating composition when higher levels of the dissolved copolymer of component (2) are present.

19. A composition as claimed in claim 1 wherein the malamine-formaldehyde resin is selected from conventional melamine-formaldehyde resins having a ratio of —CH$_2$OR groups to —CH$_2$OH groups, where R is lower alkyl, of at least 5:1.

20. A composition as claimed in claim 1 wherein the copolymer of component (1) also includes from about 1% to about 5% by weight, based on the total weight of monomers, of an ionic monomer selected from the group consisting of 2-sulphoethyl methacrylate, vinyl sulphonate and allyl sulphonate, which ionic monomer functions as a stabilizing material for the copolymer dispersion.

* * * * *